(12) United States Patent
Okamoto et al.

(10) Patent No.: US 7,995,074 B2
(45) Date of Patent: Aug. 9, 2011

(54) INFORMATION PRESENTATION METHOD AND INFORMATION PRESENTATION APPARATUS

(75) Inventors: Masayuki Okamoto, Kawasaki (JP); Hideo Umeki, Yokohama (JP); Kenta Cho, Tokyo (JP); Yuzo Okamoto, Yokohama (JP); Naoki Iketani, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 682 days.

(21) Appl. No.: 11/524,331

(22) Filed: Sep. 21, 2006

(65) Prior Publication Data

US 2007/0120871 A1    May 31, 2007

(30) Foreign Application Priority Data

Nov. 29, 2005    (JP) ................. 2005-344033

(51) Int. Cl.
*G06F 3/048* (2006.01)

(52) U.S. Cl. ........ 345/619; 715/753; 715/719; 715/721; 715/730; 715/733

(58) Field of Classification Search ............ 715/723, 715/721, 719, 733
See application file for complete search history.

(56) References Cited

U.S. PATENT DOCUMENTS

| | | | | |
|---|---|---|---|---|
| 5,572,728 | A * | 11/1996 | Tada et al. | 1/1 |
| 6,411,988 | B1 * | 6/2002 | Tafoya et al. | 709/204 |
| 7,257,774 | B2 * | 8/2007 | Denoue et al. | 715/719 |
| 2002/0161804 | A1 * | 10/2002 | Chiu et al. | 707/530 |

FOREIGN PATENT DOCUMENTS

| | | |
|---|---|---|
| JP | 07-182365 | 7/1995 |
| JP | 2004-173058 | 6/2004 |
| JP | 2004-199408 | 7/2004 |

* cited by examiner

*Primary Examiner* — Ulka Chauhan
*Assistant Examiner* — Donna J Ricks
(74) *Attorney, Agent, or Firm* — Finnegan, Henderson, Farabow, Garrett & Dunner, L.L.P.

(57) ABSTRACT

External data acquired via an input device during display of presentation information on a display device is recorded, and feature amounts are calculated from the external data. An importance level is calculated by integrating the feature amounts for each section during the display period of the presentation information. First headline information of a part of the presentation information corresponding to a section having an importance level which exceeds a predetermined threshold is generated, and is presented to be aligned along the time axis. Previous display contents of the presentation information are searched for in response to a selection operation of the first headline information, and are displayed on the display device. Second headline information of a part of the presentation information corresponding to the section when the selection operation was made is generated, and is presented on the display device.

18 Claims, 13 Drawing Sheets

| Type | Feature Amount |
|------|----------------|
| Pen | Drawing amount |
| Microphone | Tone volume |
| Camera | Image change amount |
| Reference Whiteboard | Switching, display time, reference count |
| Timeline | Reference count |

| Time | Type of feature amount | Content | Attribute |
|---|---|---|---|
| 2005/10/18 16:29:50 | Utterance | Start | Tanaka |
| 2005/10/18 16:30:10 | Utterance | End | Tanaka |
| 2005/10/18 16:30:32 | Slide operation | Start slide show | Meeting reference. ppt, 1st page |
| 2005/10/18 16:30:42 | Utterance | Start | Tanaka |
| 2005/10/18 16:30:51 | Utterance | End | Tanaka |
| 2005/10/18 16:30:52 | Slide operation | Display next page | Meeting reference. ppt, 2nd page |
| ... | ... | ... | ... |
| 2005/10/18 17:03:22 | Stroke | Marking | ☆ (120, 52) |
| ... | ... | ... | ... |
| 2005/10/18 16:30:40 | Slider | Call headline information | 2005/10/11 10:32:24 |
| ... | ... | ... | ... |
| 2005/10/18 17:59:19 | Slide operation | End slide show | Meeting reference. ppt |

| Headline start time | Headline content | Associated headline time |
|---|---|---|
| 2005/10/18 16:29:50 | Utterance | |
| 2005/10/18 16:30:10 | Display agenda | |
| .... | .... | |
| 2005/10/18 16:33:15 | Refer to previous conference minutes | |
| .... | .... | |
| 2005/10/18 16:30:52 | Refer to previous content | 2005/09/30 14:57:36 |
| .... | .... | |
| 2005/10/18 17:12:42 | Refer to slide | 2005/10/11 11:23:19 |
| .... | .... | |
| 2005/10/18 16:32:25 | Tanaka's utterance | |
| .... | .... | |
| 2005/10/18 17:57:34 | Display TODO | |

| Type | Feature Amount with attribute |
|---|---|
| Pen | Stroke (type, range), character |
| Microphone | Speech recognition, speaker |
| Camera | Gesture (type, designation range) |
| Reference | Remarkable point (scroll, zoom) Slide (title, number of pages) |
| Whiteboard | Point (range) |
| Timeline | Operator |

INFORMATION PRESENTATION METHOD AND INFORMATION PRESENTATION APPARATUS

CROSS-REFERENCE TO RELATED APPLICATIONS

This application is based upon and claims the benefit of priority from prior Japanese Patent Application No. 2005-344033, filed Nov. 29, 2005, the entire contents of which are incorporated herein by reference.

BACKGROUND OF THE INVENTION

1. Field of the Invention

The invention relates to an information presentation apparatus which allows easy access to information presented previously.

2. Description of the Related Art

In conferences, classes, and the like, a display device and an electronic whiteboard are utilized. These devices are used in explanations and discussions by projecting presentation data using a projector, a monitor of a personal computer, and the like. In the case of the electronic whiteboard, arbitrary contents can be written with respect to presentation information by detecting the position of a pen or fingertip.

In such activities, users sometimes want to refer to references which were referred to previously or contents which were written previously again. In such a case, all too often, the saving locations are searched for to display such references or contents, or the holder of the references re-connects his or her personal computer and display device to display the references, or the written contents are lost and cannot be displayed. Therefore, in order to present previously presented contents, high human and time costs are required.

In order to remove such costs, a method of recording full events of the conferences or classes, and presenting the contents again by providing a search user interface has been proposed. For example, JP-A No. 2004-199408 (KOKAI) describes assignment of the degree of activity using annotations, and its application in generation of abstracts.

JP-A No. 2004-173058 (KOKAI) describes a technique for searching conference data by visualizing feature amounts of audio information, image information, and sensor information.

JP-A No. 7-182365 (KOKAI) and U.S. Pat. No. 5,572,728 describe a system which presents the conference minutes along with an elapse of time, and allows to review the previous contents of the proceedings along with the conference minutes.

During a conference, the presenter often conducts the conference while reviewing the important contents of the proceedings that have already been made in that conference. At this time, it is preferable for the presenter who presents presentation data such as references or the like to easily call the already presented presentation data, which correspond to such important contents of the proceedings, and to present them again.

It is also preferable to record the fact itself that the presenter conducted the conference while reviewing the previous contents of the proceedings as the important contents of the proceedings, and to update headline information (conference minutes) presented on the search interface accordingly during the proceedings. However, no such search interface with real-timeness has been provided yet.

BRIEF SUMMARY OF THE INVENTION

An information presentation method according to one aspect of the invention comprises: recording external data acquired via an input device during display of presentation information on a display device; calculating a feature amount from the external data; calculating an importance level by integrating the feature amount for each predetermined section of a display period of the presentation information; generating first headline information of a given part of the presentation information corresponding to a section having an importance level which exceeds a predetermined threshold; presenting the generated first headline information on the display device to be aligned along a time axis; searching for previous display contents of the presentation information in response to a selection operation of the first headline information using the input device; displaying the searched previous display contents on the display device; generating second headline information of a part of the presentation information corresponding to the section when the selection operation was made; and presenting the second headline information on the display device in addition to the first headline information aligned along the time axis.

DETAILED DESCRIPTION OF THE INVENTION

An embodiment of the invention will be described hereinafter with reference to the accompanying drawings.

Since the embodiment provides means to obtain and record feature amounts of written contents, referred references, speech, and the like during a conference, calculate the importance level of a given scene in the conference based on these feature amounts, and generate headline information indicating representative scenes in the conference, an arbitrary previous scene in the conference can be easily extracted. The embodiment can be implemented using a general purpose computer which comprises a control device such as a CPU or the like, storage devices such as a ROM, RAM, and the like, an external storage device such as an HDD or the like, a display device such as a CRT or the like, and input devices such as a keyboard, mouse, and the like.

Figure 1:
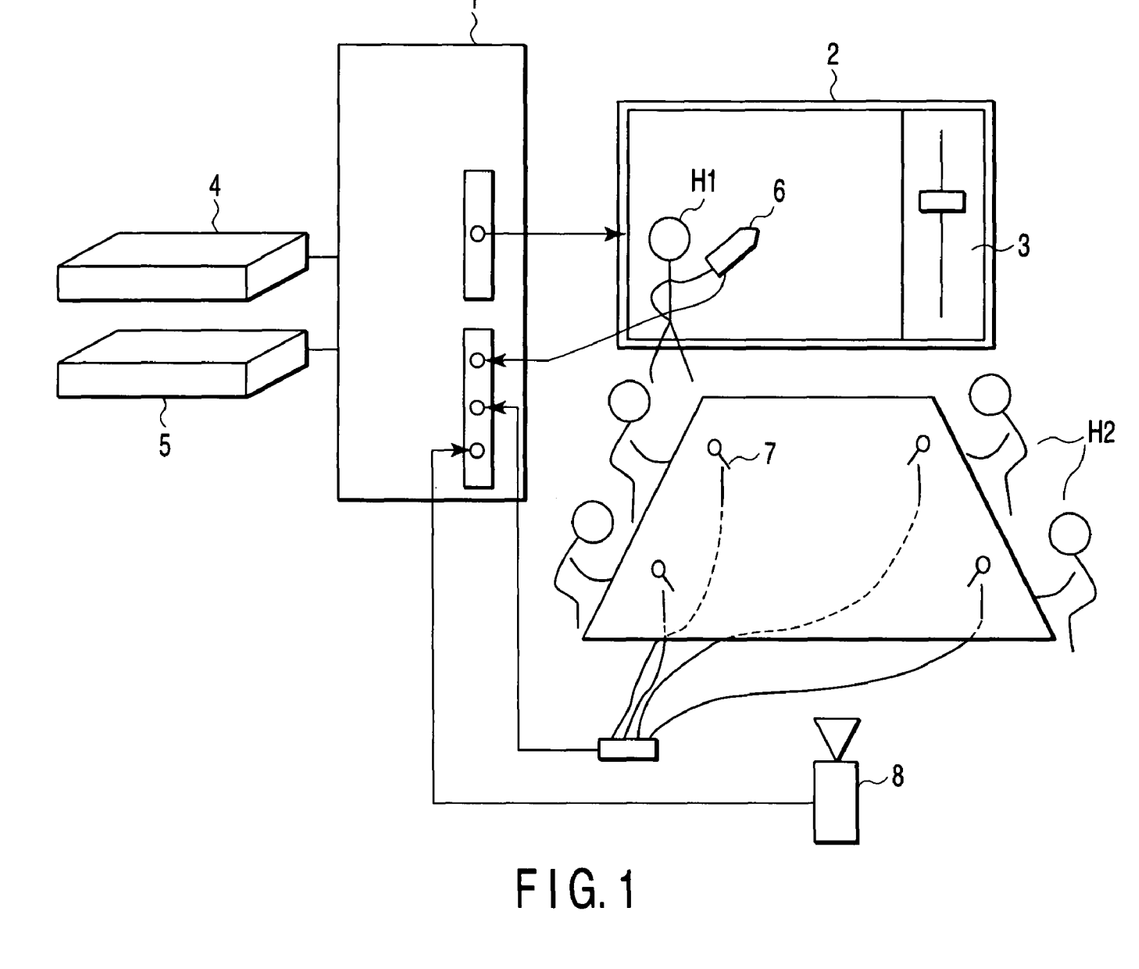
FIG. 1 is a schematic view showing a conference support system according to an embodiment.

As shown in FIG. 1, the conference support system comprises a meeting server 1, electronic whiteboard 2, reference storage 4, conference log storage 5, pen 6, microphones 7, camera 8, and the like.

The electronic whiteboard 2 is connected to the meeting server 1, which reads a reference file used in a conference from the reference storage 4 and transmits the read reference file to the electronic whiteboard 2. The reference files stored in the reference storage 4 are digital files created using, e.g., PowerPoint®, Excel®, and the like available from Microsoft Corporation.

The pen 6 is an input device which is used by, e.g., a presenter H1 in the conference to designate a position and to write a line image, characters, and the like on the display screen of the electronic whiteboard 2.

The microphones 7 are used to record the utterances of participants H2. The camera 8 is provided to record the process of the conference as video data. The inputs from the microphones 7 and camera 8, the inputs to the electronic whiteboard using the pen 6, presentation and editing of reference s, the screen and screen switching of the electronic whiteboard 2, and the like undergo central control of the meeting server 1, and are recorded in the conference log storage 5 connected to the meeting server 1.

The electronic whiteboard 2 can display data recorded in the conference log storage 5 on its screen as needed. For this purpose, the electronic whiteboard 2 comprises a timeline user interface (to be referred to as "timeline" hereinafter) 3 for reading out previous records by slider operations.

Figure 2:
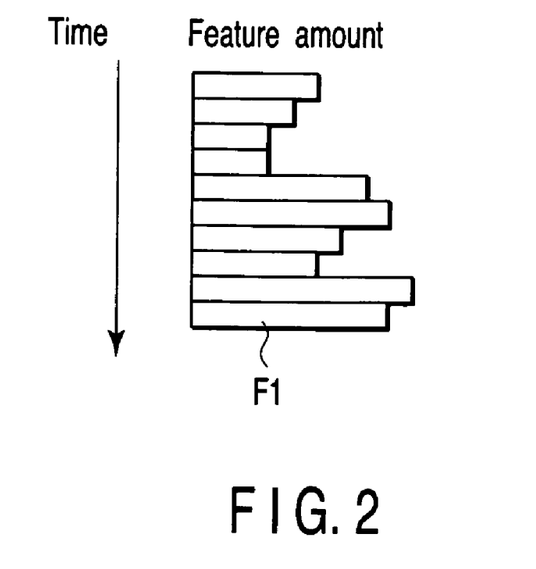
FIG. 2 shows a recording example of feature amounts along with an elapse of time.
Figure 3:
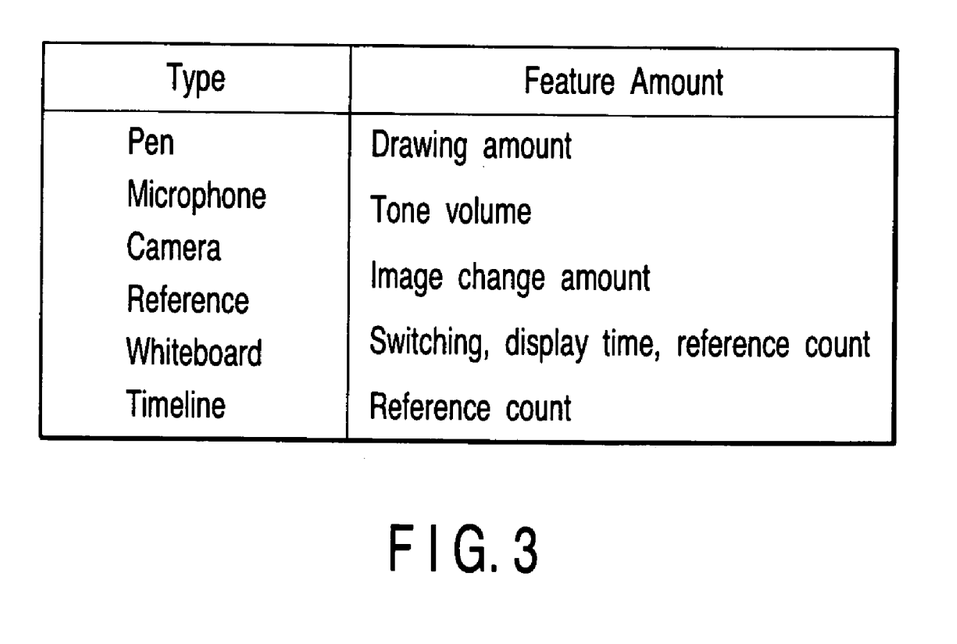
FIG. 3 shows an example of types of feature amounts.

The conference log storage 5 converts inputs from the pen 6 and the like into values called "feature amounts", and records the feature amounts in a given time band together with time information. FIG. 2 shows feature amounts to be recorded. In FIG. 2, the values of feature amounts F1 which are generated during a given period of time are recorded along the time axis. The feature amounts F1 have some types, and are recorded while being classified into respective types. FIG. 3 shows an example of the types of feature amounts. For example, a feature amount of "pen" is "drawing amount", that of "microphone" is "tone volume", that of "camera" is "image change amount", that of "reference" is "switching, display time, reference count", that of "whiteboard" is "switching, display time, reference count", and that of "timeline" is "reference count".

As the feature amount based on the input using the pen 6, the amount of drawing using the pen 6 within a predetermined period of time is used. The drawing amount is measured by calculating a total of lengths of vector data drawn using the pen 6. The feature amount may be changed depending on the width, color, and the like of the pen.

As the feature amount based on the input using the microphone 7, a total of the tone volumes input to the microphone is used. When there are a plurality of microphones 7, a total of the tone volumes of these microphones 7 is used. This feature amounts increases in a scene in which many statements are given by discussions or the like in the conference. As the feature amount, a time period in which an input that exceeds a predetermined tone volume is obtained may be used.

As the feature amount based on the input using the camera 8, an image change amount between frames is used. The image change amount increases when each participant H2 makes some gestures or when he or she switches the reference on the electronic whiteboard 2 or writes some comments on the reference.

Operations with respect to the reference displayed on the electronic whiteboard 2 via the meeting server 1 are also used as a feature amount. More specifically, a given feature amount may be added to occurrence of an event of switching of slide pages, and a display time indicating how long a given slide is displayed on the electronic whiteboard 2, and a reference count indicating how many times the slide is displayed or edited may be used as feature amounts. These plurality of feature amounts may be simply combined and the combined feature amount may be handled as that for the reference or they may be handled as independent feature amounts.

Also, operations on the electronic whiteboard 2, i.e., a page switching operation, page display time, reference time, and the like are used as feature amounts as those associated with the reference.

Using the timeline 3 on the electronic whiteboard 2, previous conferences stored in the conference log can be referred to. In this case, the reference count indicating the number of times of reference to the conference log in a given time band can be used as a feature amount. The timeline 3 can be switched to one of some display modes, i.e., a mode for displaying a slider alone, a mode for displaying character strings corresponding to headlines, and a mode for displaying thumbnail images indicating headlines, as needed. The direction of the timeline 3 can be switched to one of horizontal and vertical directions, as needed.

These recorded feature amounts are used to determine which part of the conference is important for the participants H2.

Figure 4:
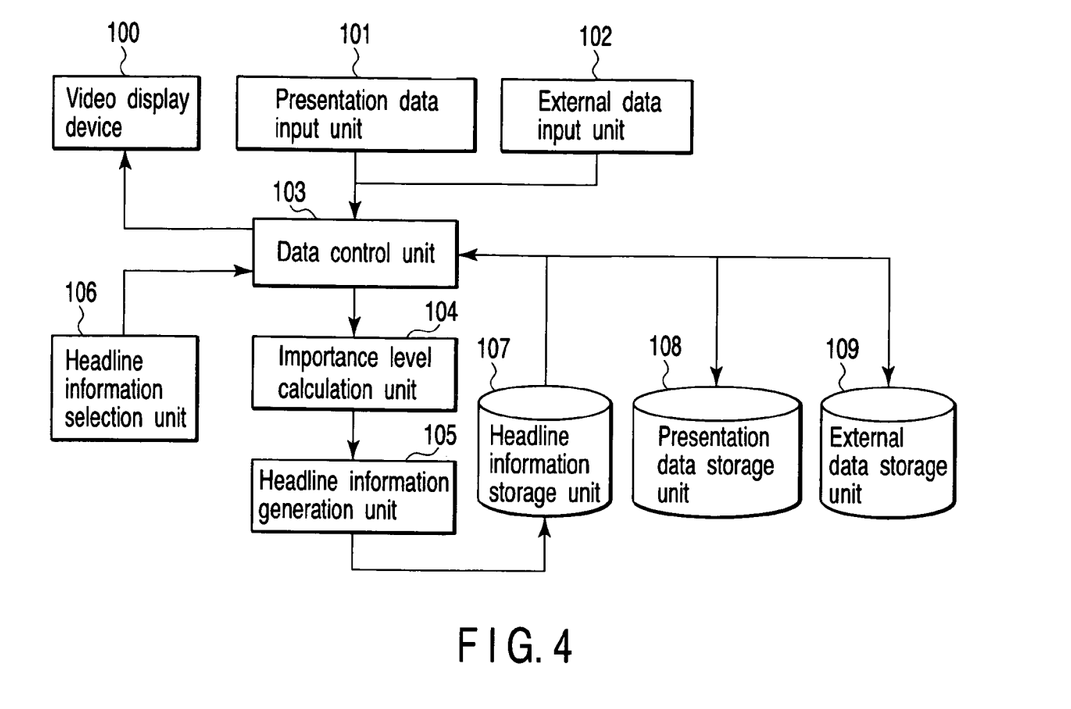
FIG. 4 is a functional block diagram of a conference reference recording and presentation apparatus.

As shown in FIG. 4, a conference reference recording and presentation apparatus is configured based on the meeting server 1, reference storage 4, and conference log storage 5 shown in FIG. 1. The conference reference recording and presentation apparatus comprises a video display device 100, presentation data input unit 101, external data input unit 102, data control unit 103, importance level calculation unit 104, headline information generation unit 105, headline information selection unit 106, headline information storage unit 107, presentation data storage unit 108, and external data storage unit 109.

The headline information storage unit 107, presentation data storage unit 108, and external data storage unit 109 may comprise every kind of storage device such as an optical disk, memory card, RAM, and the like, which are prevalently used.

The respective functional blocks will be explained below. The data structures which form the respective functional blocks and the processing sequence will be described later.

The video display device 100 is a display device such as a video projector, the electronic whiteboard 2, a screen of a personal computer, and the like, and displays presentation data and the timeline 3 on the electronic whiteboard 2. The presentation data input unit 101 receives a video signal of data to be projected onto the video display device 100 and file attributes of data as inputs. The external data input unit 102 receives data such as the input from the pen 6, audio information, and the like, which are to be recorded together with video projection. The data control unit 103 combines data obtained from the presentation data input unit 101 and external data input unit 102 based on time information, stores them in the presentation data storage unit 108 and external data storage unit 109, and outputs video data to be projected to the video display device 100. The data control unit 103 provides a function of reading out headline information from the headline information storage unit 107, and displaying the read information together with the timeline 3 on the electronic whiteboard 2. The importance level calculation unit 104 acquires presentation data and external data from the data control unit 103, calculates importance levels of projected video data, and divides the video data into predetermined sections according to the importance levels. The headline information generation unit 105 generates headline information to be displayed on the timeline 3 for a section with a high importance level calculated by the importance level calculation unit 104. The headline information selection unit 106 reads display data corresponding to a headline selected using the timeline 3 displayed on the video display device 100 from the data control unit 103, and displays it on the video display device 100. The importance level of the video section corresponding to the headline information selected by the headline information selection unit 106 is updated by the importance level calculation unit 104. The headline information storage unit 107 stores headline information generated by the headline information generation unit 105. The presentation data storage unit 108 stores information such as video data of presentation data, file attributes and reference destinations of data, and the like. The external data storage unit 109 stores the above-mentioned feature amounts recorded during presentation of the presentation data.

The operation of the embodiment of the invention with the above arrangement will be described below.

The processing sequence upon recording feature amounts in the conference log storage 5 is described with reference to FIG. 5. Simultaneously with the start of a conference (step S101), feature amounts begin to be recorded. Initially, conference information is recorded in the conference log storage 5 (step S102). The conference information includes image information to be displayed on the electronic whiteboard 2, movie data that records the process of the conference from the camera 8, audio data captured from the microphones 7, and the like. At the same time, feature amounts shown in FIG. 3 are calculated, and are recorded in correspondence with their types (step S103). The conference information and feature amounts are recorded together with time information. The aforementioned recording operation is continued until the end of the conference (step S104). Finally, all of the information and feature amounts acquired throughout the conference are stored in any of the meeting server 1, conference log storage 5, and reference storage 4.

Figure 6:
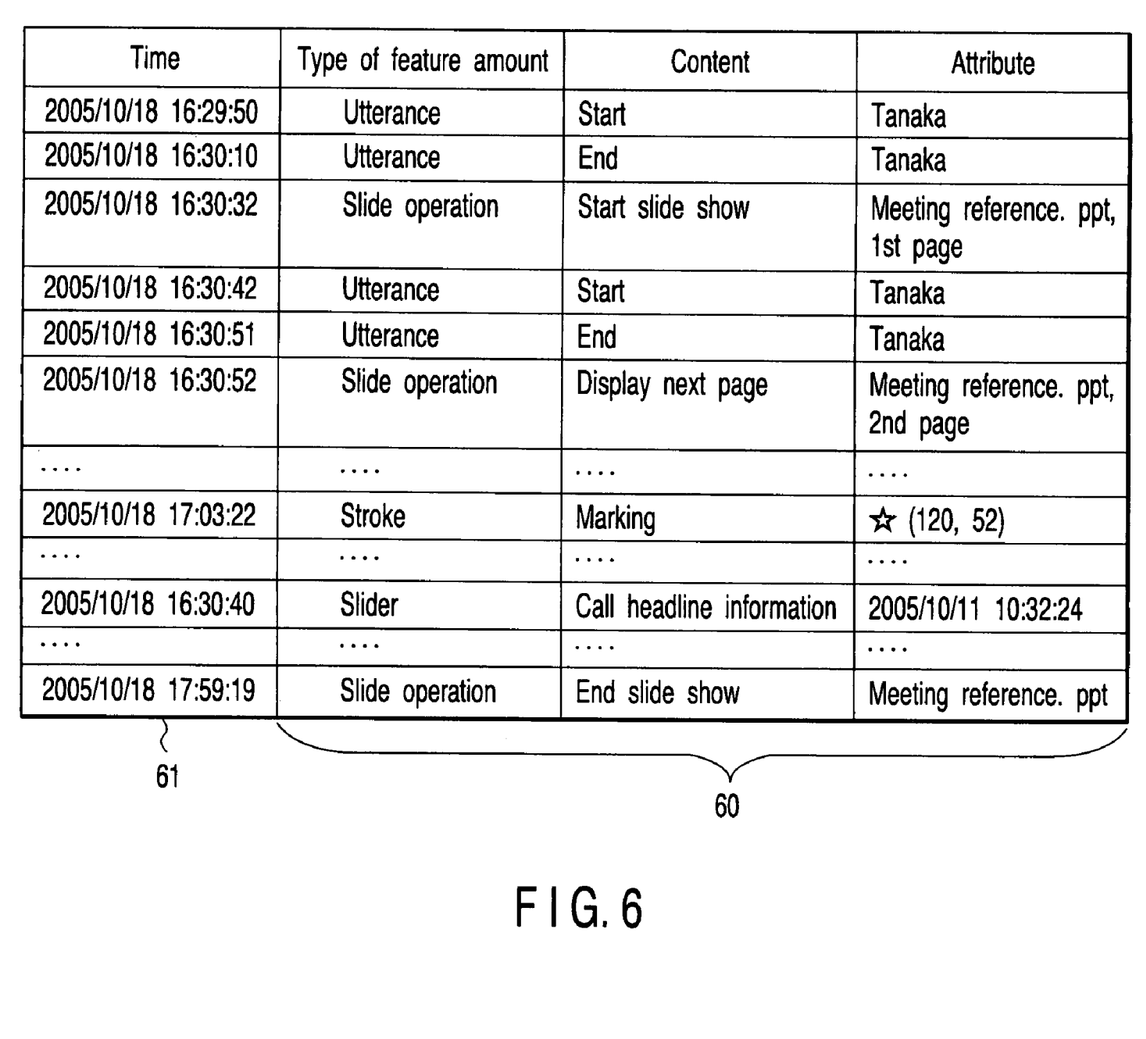
FIG. 6 shows an example of events to be stored in the conference log storage 5.

An example of events stored in the conference log storage 5 is shown in FIG. 6. Feature amounts 60 such as image display on the electronic whiteboard 2, utterances, inputs from the pen 6, and the like are stored together with time stamps 61.

Figure 7:
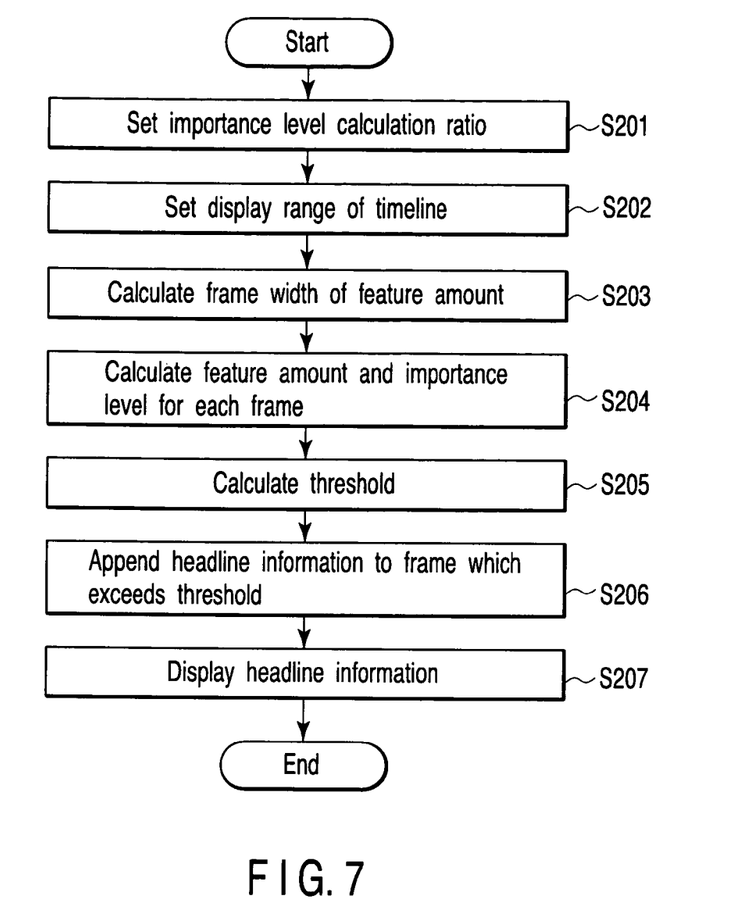
FIG. 7 is a flowchart showing the sequence executed for performing processing including headline information generation of a timeline 3 using recorded conference information and feature amounts.

The sequence for performing processing including headline information generation of the timeline 3 using the recorded conference information and feature amounts is described with reference to FIG. 7. Note that this processing is executed in parallel with the conference recording operation of FIG. 5.

Figure 8:
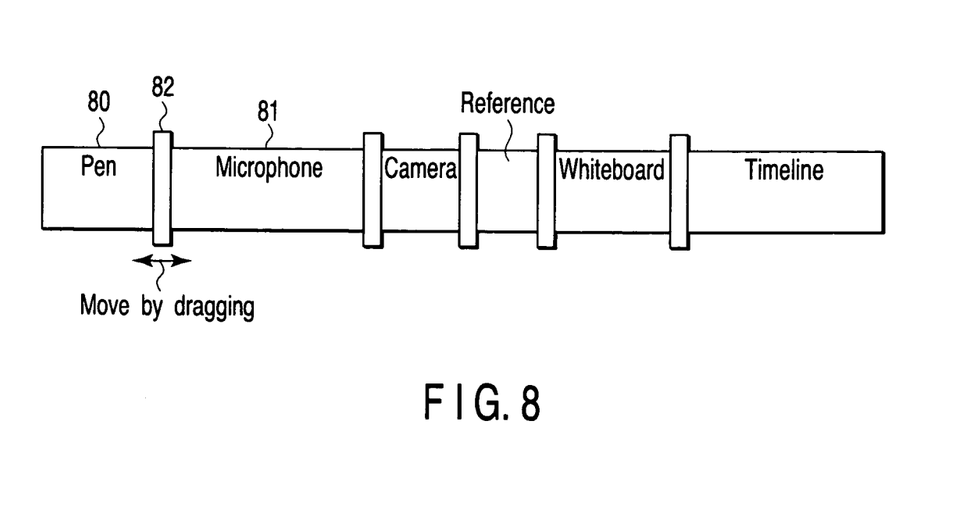
FIG. 8 shows an example of a user interface used to set an importance level calculation ratio.

An importance level calculation ratio used to calculate an importance level in each scene from a plurality of types of feature amounts is set (step S201). The importance level calculation ratio is used to calculate an importance level using a plurality of types of feature amounts, and sets to which type of feature amounts importance is attached upon calculating the importance level. FIG. 8 shows an example of a user interface used to set the importance level calculation ratio. The ratios of the influence on the importance levels for respective types are represented by the lengths of bars 80, 81, . . . . The user can change the ratios by dragging a slider 82 between the bars 80 and 81 to the right or left.

Next, a time range to be displayed on the timeline 3 is set (step S202).

Based on the set time range, the degree of granularity of a time range upon calculating feature amounts and importance levels is set (step S203). This time range will be referred to as a frame hereinafter.

Figure 9:
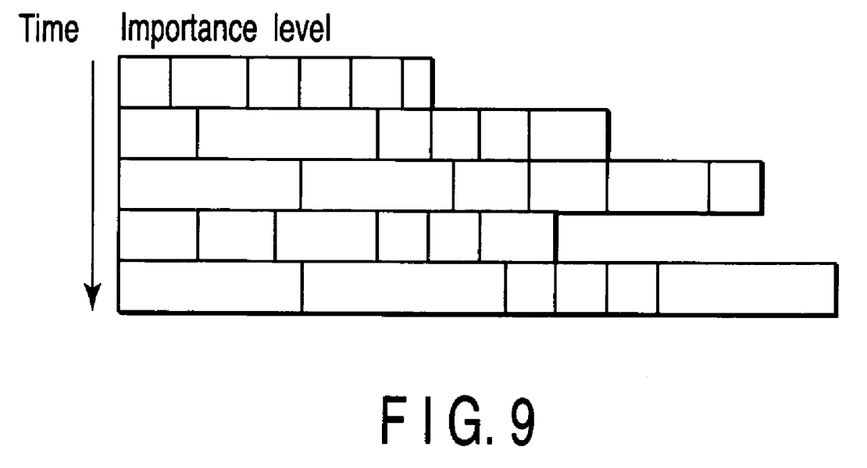
FIG. 9 shows a calculation example of the importance level by combining the feature amounts according to the importance level calculation ratio.

The feature amounts and importance level of each frame are calculated (step S204). The feature amounts are obtained by combining the feature amounts of time bands included in that frame. The importance level is obtained by combining these feature amounts in accordance with the importance level calculation ratio, as shown in FIG. 9. These processes are executed by the importance level calculation unit 104 in FIG. 4.

A threshold of the importance level used to calculate an important frame to which headline information is to be added from those frames is calculated (step S205). The threshold is set based on the number of pieces of headline information that can be displayed on the timeline 3 and the calculated importance levels of the frames so that the number of frames which have importance levels that exceed the calculated threshold falls within the number of pieces of headline information that can be displayed. The number of pieces of headline information that can be displayed on the timeline 3 is determined based on limitations such as the display range on the electronic whiteboard 2, and the like.

Figure 10:
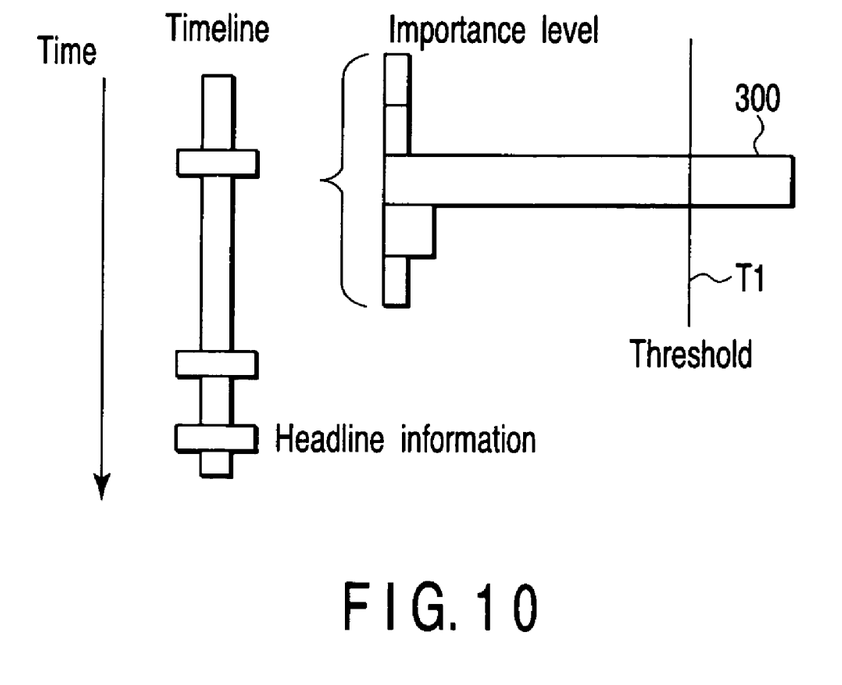
FIG. 10 shows comparison between the importance levels and a threshold.
Figure 11:
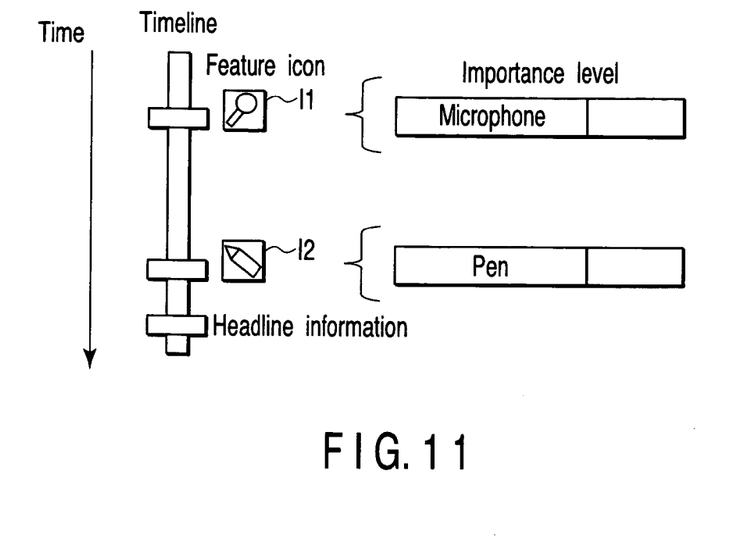
FIG. 11 shows a display example of feature icons which indicate the types of feature amounts that contributes to the importance levels.

As shown in FIG. 10, after a threshold T1 is calculated, headline information is added to each of frames which have importance levels 300 that exceed the threshold T1 (step S206). As shown in FIG. 11, when the importance level of that frame includes specific feature amounts at high ratios, icons corresponding to the types of these feature amounts may be displayed as feature icons I1 and I2. These processes are executed by the headline information generation unit 105 shown in FIG. 4, and the generated headline information is stored in the headline information storage unit 107.

Figure 12:
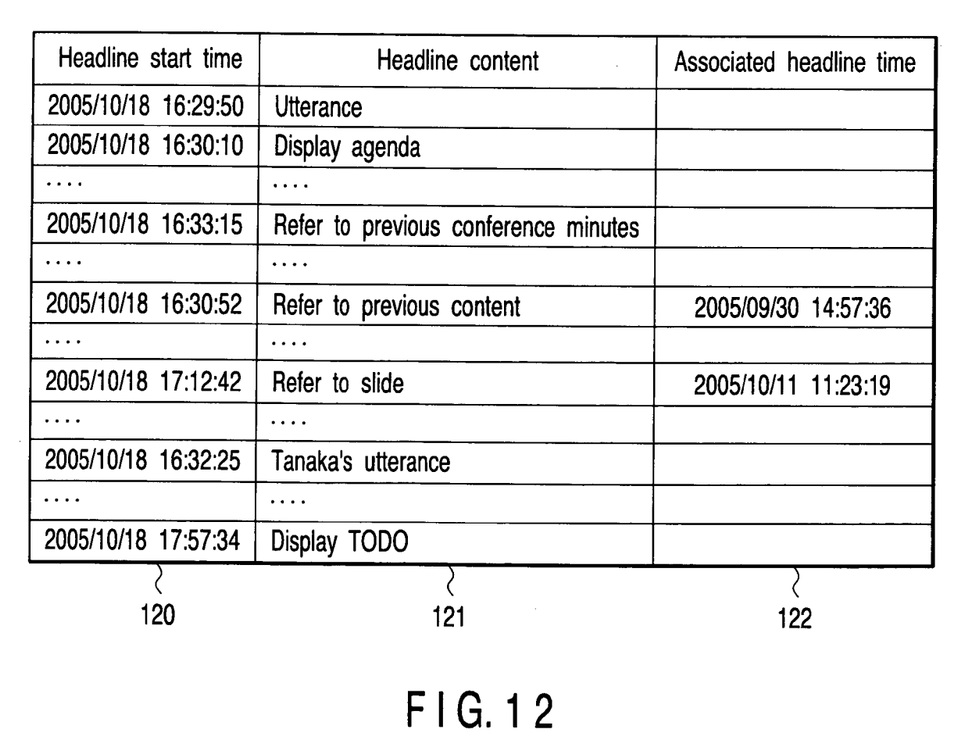
FIG. 12 shows a storage example of headline information.

FIG. 12 shows a storage example of the headline information. Headline contents 121 based on the calculation result of the importance level, and an associated headline time 122 associated with the headline of interest as association to another headline information are stored together with a headline start time 120. Association with another headline information will be described later.

Figure 5:
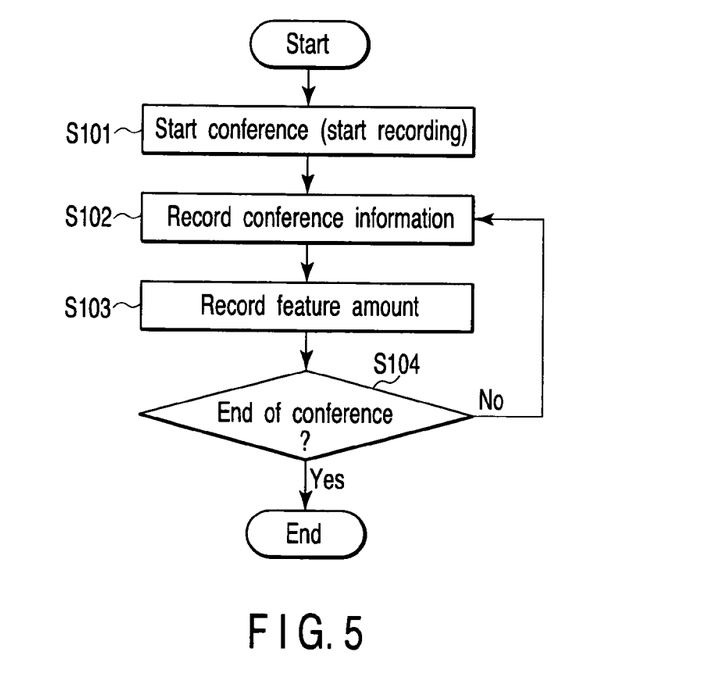
FIG. 5 is a flowchart showing the processing sequence for recording feature amounts in a conference log storage 5.

Upon recording feature amounts in FIG. 5, not only a value indicating the amount but also attribute information associated with that feature amount may be acquired. In this case, information obtained by appending an attribute corresponding to each type of feature amount to that feature amount is recorded in the conference log storage 5.

Figure 13:
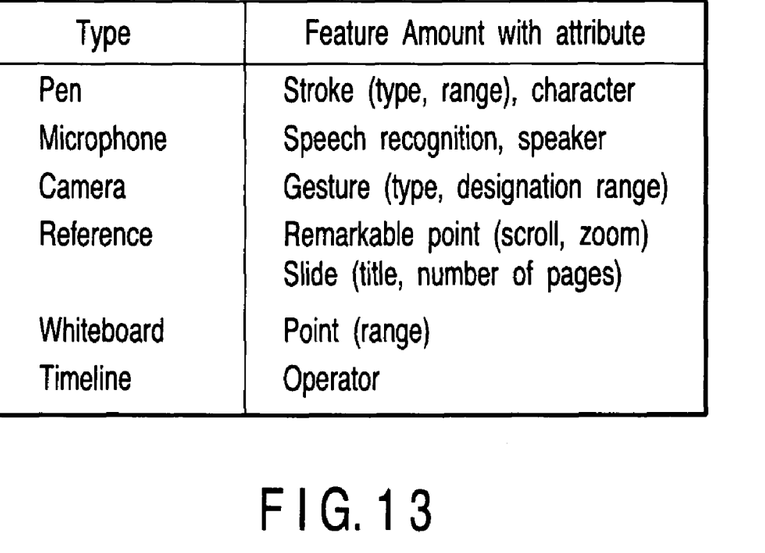
FIG. 13 shows an example of feature amounts with attributes recorded in the conference log storage 5.

For the input using the pen 6, a description of a specific figure such as a circle, underline, or the like by the pen 6 operated by, e.g., the presenter H1 is recognized as a stroke, and the type of that figure and a range on the whiteboard 2 covered by the figure can be appended as attributes. By applying character recognition, information indicating characters described using the pen 6 can be appended.

For the input using the microphone 7, a character string of a statement can be appended by speech recognition. Also, information indicating a speaker can be appended based on the tone volumes of the microphones 7 equipped in front of the participants H2.

For the input using the camera 8, information indicating the gesture of each participant H2 can be appended by image recognition. The gesture information includes the type of action, and a designation range indicating the range designated on the electronic whiteboard 2.

For presentation of the reference, a remarkable point can be determined and appended based on scrolling or zooming required to display a specific part of that reference. As for slides, information indicating a title of the slides and the page number of the slides can be appended.

As for the operations on the electronic whiteboard 2, a range of pointing which is made using a pointer function can be appended as information.

Referring back to FIG. 7, headline information on the timeline 3 is made using the headline display unit (video display device 100) in FIG. 4 (step S207). As for the operation for the timeline 3, information of an operator who made that operation can be appended.

Figure 14:
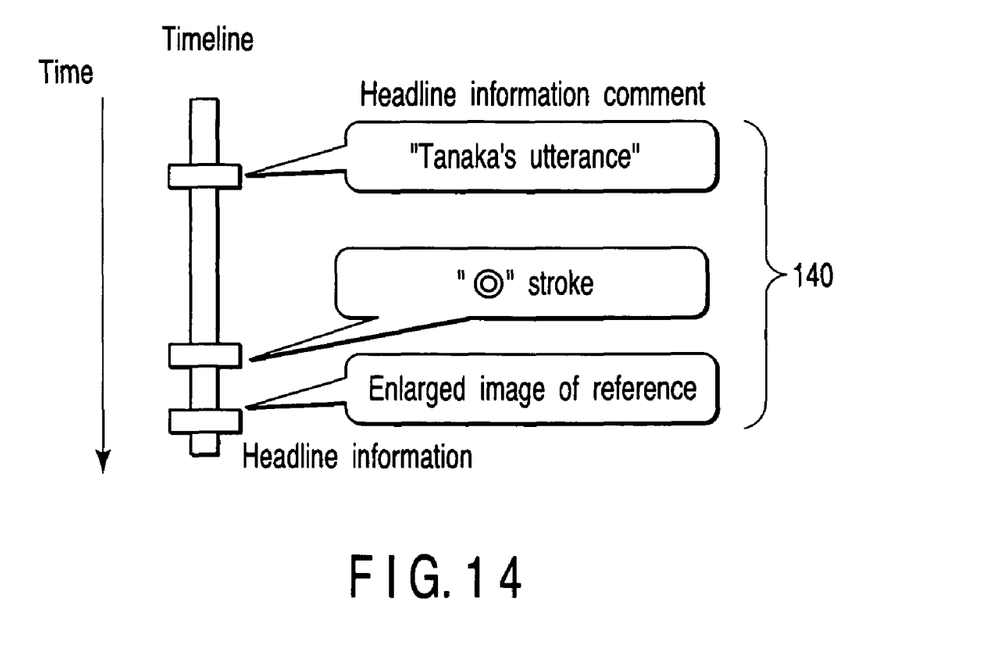
FIG. 14 shows a display example of comments for the headline information.
Figure 15:
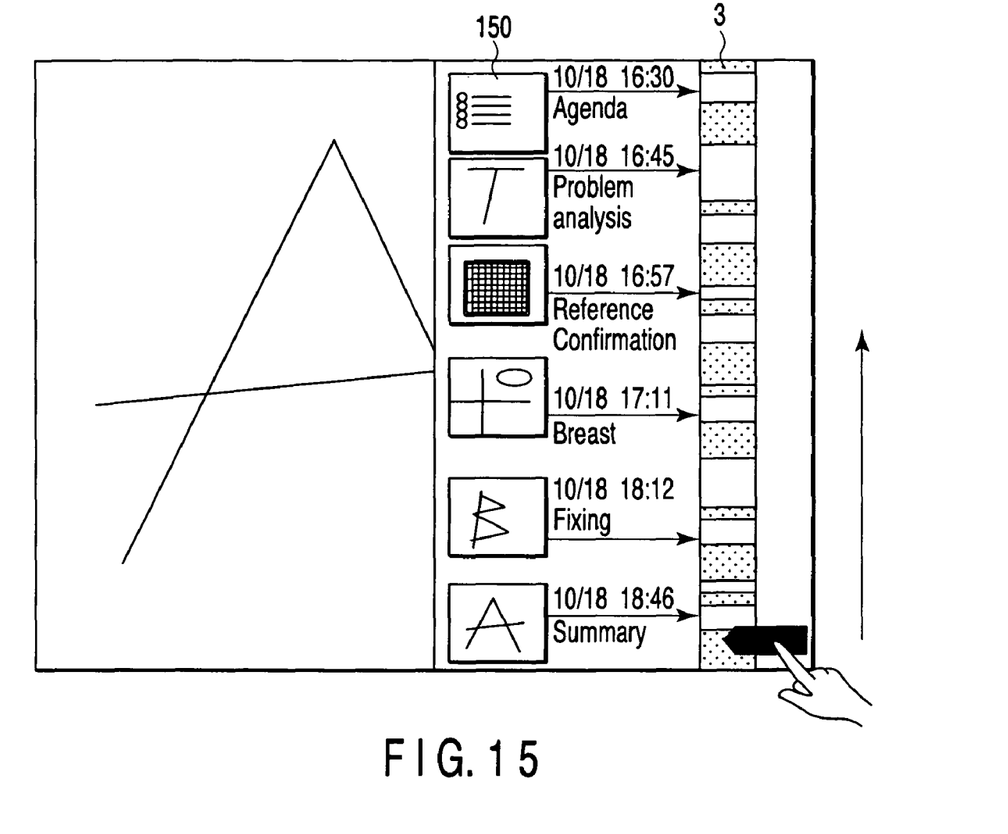
FIG. 15 shows an associating display example of the timeline 3 and thumbnail images 150.

When the aforementioned attributes are appended to the feature amounts, a comment 140 of headline information can be appended based on the attribute of the feature amount corresponding to that headline information, as shown in FIG. 14. By increasing the value of a feature amount having a specific attribute, it becomes easier to append headline information to a frame having an important attribute. Also, as shown in FIG. 15, the timeline 3 and thumbnail images 150 may be displayed in association with each other.

Figure 16:
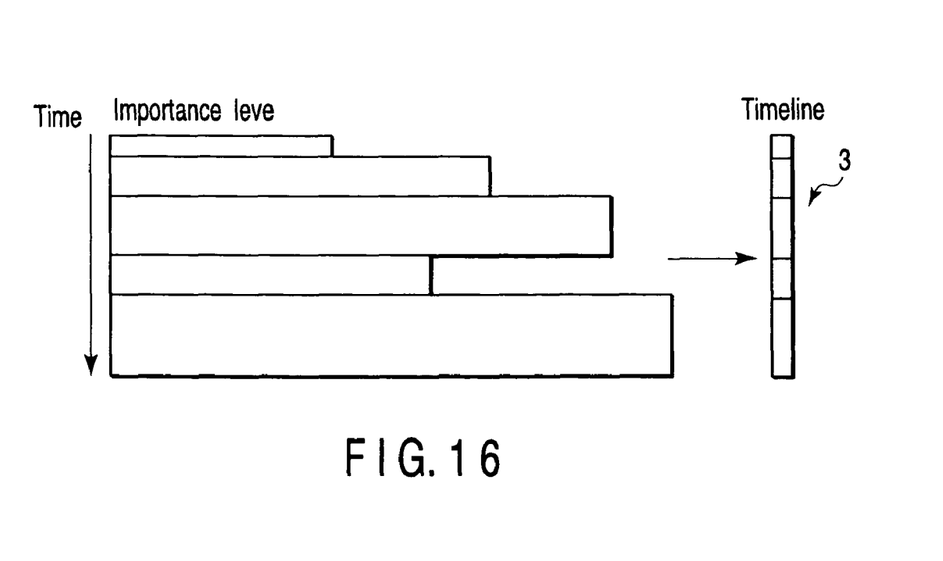
FIG. 16 shows a change example of display granularity in accordance with the importance levels of frames.

Note that the importance level may be calculated based on a change amount of the feature amount from the previous frame. A plurality of continuous frames which exceed the threshold may be grouped, and one headline information may be appended to these frames. As shown in FIG. 16, by changing the lengths of frames displayed on the timeline 3 in correspondence with the importance levels of frames, the display granularity between important and non-important frames may be changed.

[Association with Another Headline Information]

Figure 17:
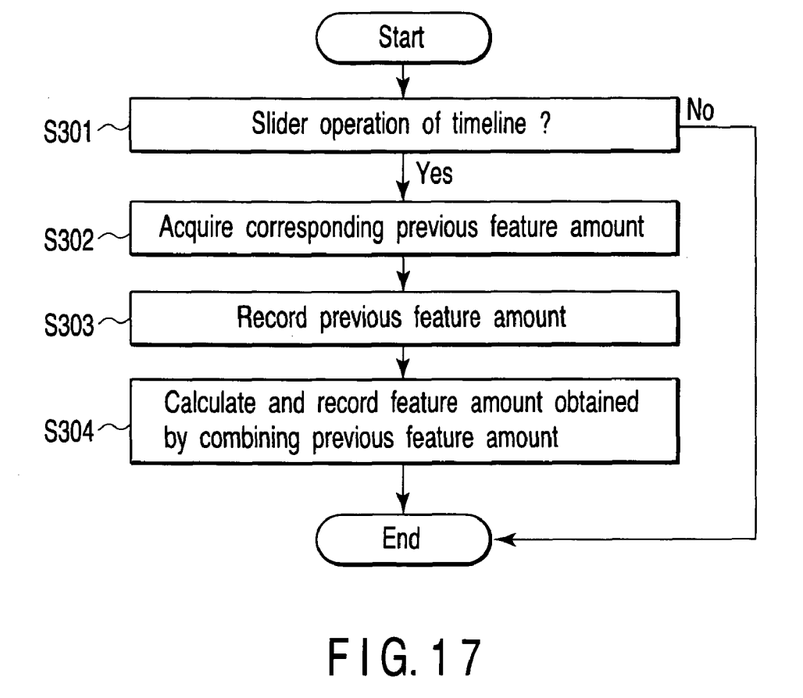
FIG. 17 is a flowchart showing the processing sequence when previous feature amounts are recorded to perform importance level determination in consideration of feature amounts in the previous proceedings.
Figure 18:
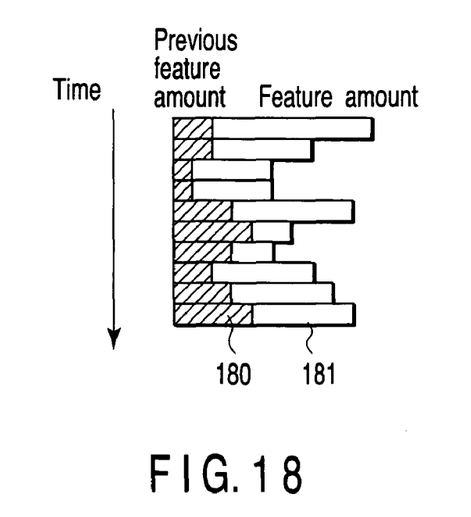
FIG. 18 is a view showing a combination of previous feature amounts 180 and normal feature amounts 181 which are acquired in real time.

The processing for recording previous feature amounts used to determine the importance level in consideration of feature amounts in the previous proceedings when the user reviews the previous proceedings by operating the slider on the timeline 3 upon recording feature amounts in FIG. 5 is described with reference to FIG. 17. When the previous proceeding is called onto the electronic whiteboard 2 by operating the slider on the timeline 3 (step S301), a feature amount of a time period corresponding to that previous proceeding is acquired (step S302), and that value is temporarily recorded in a work memory or the like as a previous feature amount (step S303). As shown in FIG. 18, the sum of a previous feature amount 180 and a normal feature amount 181 acquired in real time becomes a feature amount at that time, and is used in calculation of the importance level (step S304). The previous feature amount may be multiplied by a given coefficient before it is recorded to have a weight that influences the calculation of the importance level to be different from the normal feature amount.

The headline display contents before and after review of the previous proceedings are associated with each other. An example in which data displayed previously is referred to again and information is added to the referred data will be described below using FIG. 19 and the flowchart of FIG. 20.

Figure 19:
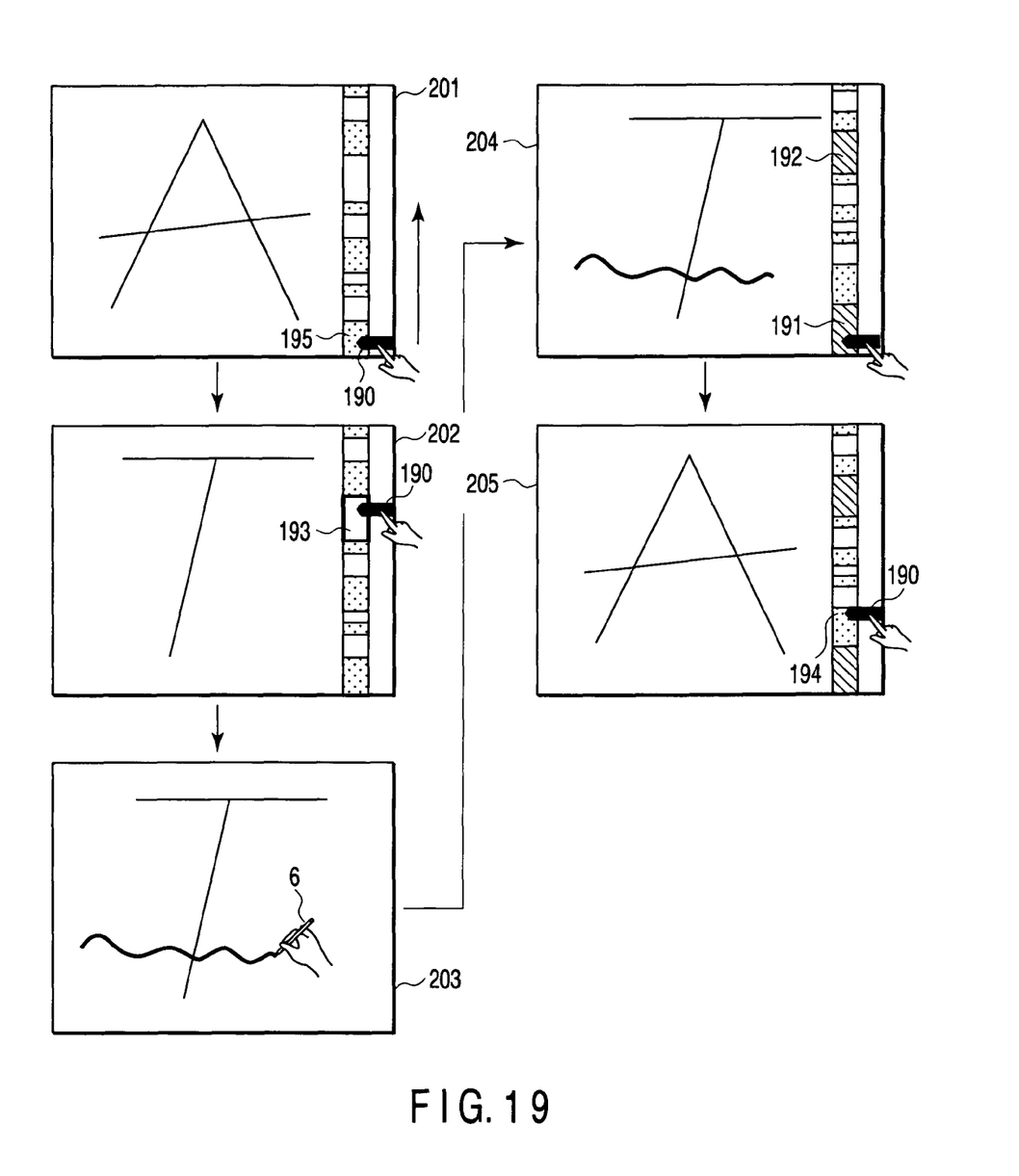
FIG. 19 is a flowchart for explaining association between the headline display contents before and after review of the previous proceedings.

The headline information selection unit 106 in FIG. 4 is called when the user slides a slider 190 like a screen 202 immediately after he or she draws letter "A" on a screen 201, and an image corresponding to the slide position is displayed. On the screen 202, "T" drawn previously is displayed. At this time, new headline information is generated, and is associated with old headline information which is referred to. When the user displays the slider 190 like a screen 204 after he or she additionally draws on "T" like a screen 203, another area 191 is added below an area displayed upon drawing "A". An area 192 on the screen 204, which corresponds to an area 193 upon referring to "T" on the screen 202, is displayed in a different display mode by adding, e.g., hatching. When "A" drawn immediately before "T" is edited again, it is displayed by sliding the slider 190 to an immediately upper area 194 like a screen 205. The area 194 on this screen 205 corresponds to an area 195 on the screen 201.

Figure 20:
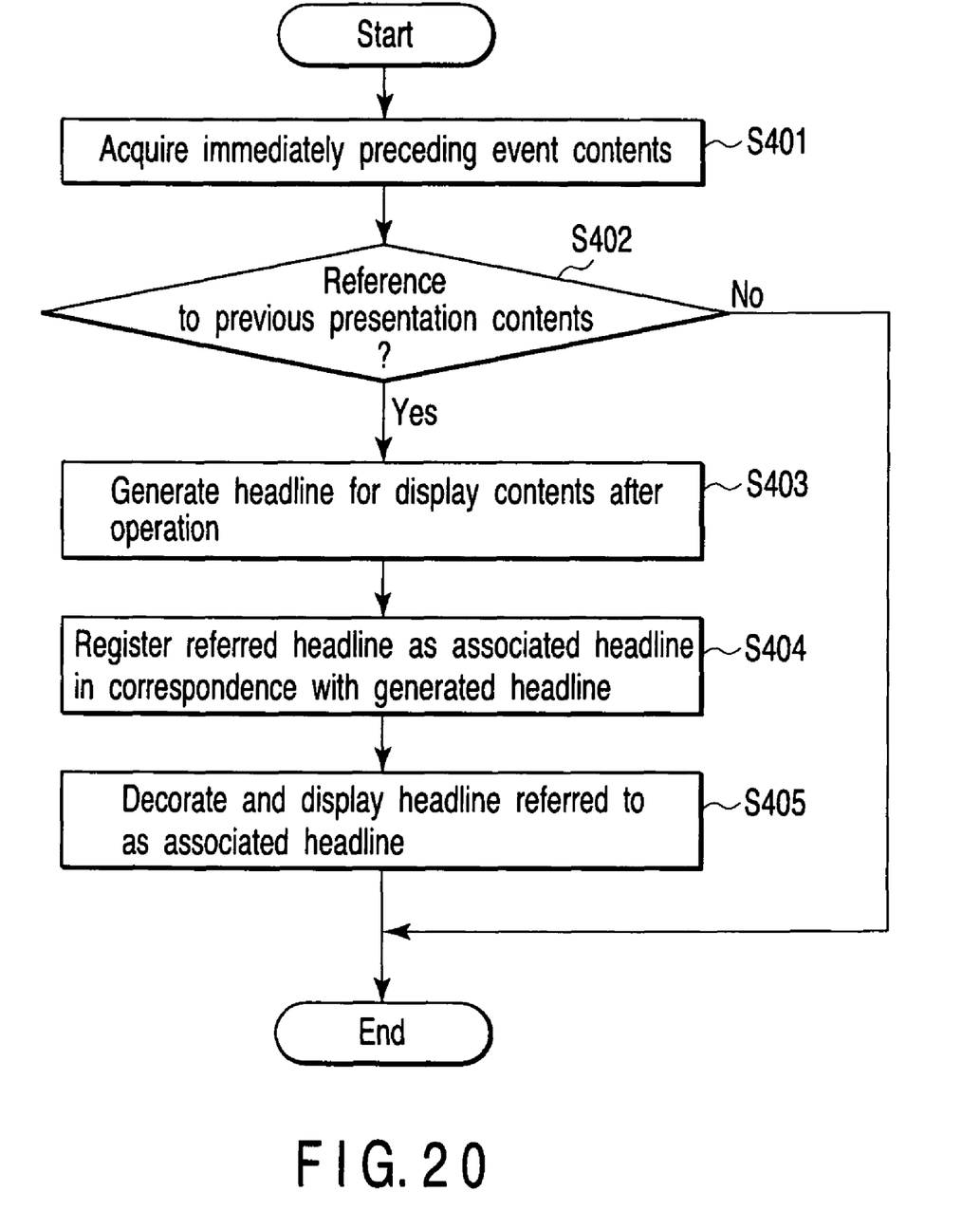
FIG. 20 shows an associating display example of the headline display contents before and after review of the previous proceedings.

As shown in FIG. 20, immediately preceding event contents are acquired (step S401). Next, it is checked in step S402 if the previous presentation contents are to be referred to. If it is determined that the previous presentation contents are to be referred to, a headline of the displayed contents immediately after the operation is generated (step S403), and a headline of the reference source is registered as an associated headline in correspondence with the generated headline (step S404). The headline referred to as the associated headline is decorated (area 192) and displayed (step S405).

Figure 21:
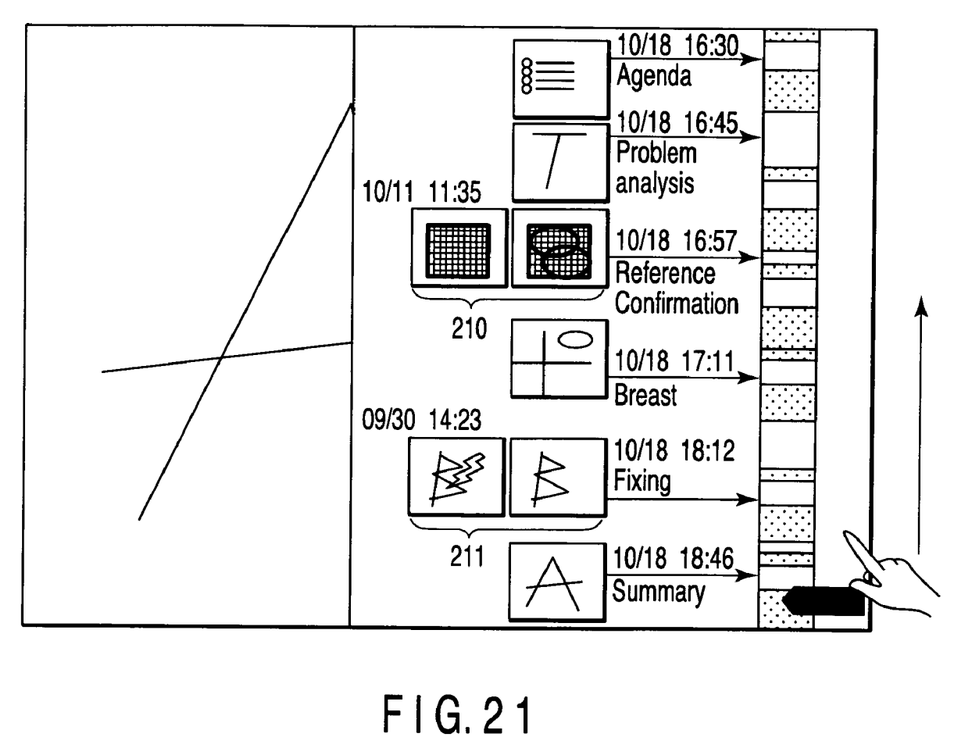
FIG. 21 shows a display example of associated headline information.

As a method of associating and displaying previously displayed data, in addition to the method of decorating and displaying the data, headlines 210 that display identical files and headlines 211 having a reference relationship may be displayed side by side, as shown in FIG. 21, thus allowing quick access to the associated headline information.

As described above, according to this embodiment, by appending headline information onto the timeline 3 in accordance with the importance levels, an important scene on the timeline 3 can be easily called onto the electronic whiteboard 2. Since the importance level is calculated from a plurality of feature amounts, and the user interface which is used to set which of feature amounts is to be weighted upon appending headline information is equipped, appropriate headline information according to the user who uses the system or the scene can be obtained. The number of pieces of headline information can be suppressed to an appropriate value which can be displayed, even when the time range displayed on the timeline 3 is changed so as to cope with a change in time granularity on the timeline 3.

Feature icons which indicate that the corresponding feature amounts are determined to be important from specific features, and headline information comments obtained based on the attributes appended to the features can be added to the headline information. Based on such information, a scene in the conference that the user wants can be easily designated from a plurality of pieces of headline information.

By adjusting the lengths of frames on the timeline 3 in correspondence with the feature amounts, an important part in the conference can be visually determined. In addition, when the previous proceeding is to be referred to using the slider on the timeline 3, a scene with a higher importance level can be referred to with a finer granularity importance level.

The feature amount is calculated in consideration of the previous feature amount, and the importance level of a scene which is reviewed using the slider is increased. Then, the importance level of the scene which is referred to many times during the conference is increased. As a result, the headline information can be updated in real time, and a scene which repetitively attracted attention during the conference can be easily called based on displayed headline information after update.

Note that a conference reference recording and presentation program executed by the conference reference recording and presentation apparatus according to the embodiment of the invention can be provided while being recorded on a computer-readable recording medium such as a CD-ROM, floppy® disk, CD-R, DVD, and the like as a file in an installable or executable format.

Also, the conference reference recording and presentation program executed by the conference reference recording and presentation apparatus according to the embodiment may be provided by storing that program on a computer connected to a network such as the Internet or the like, and downloading the program via the network. Furthermore, the conference reference recording and presentation program executed by the conference reference recording and presentation apparatus according to the embodiment may be provided or distributed via a network such as the Internet or the like.

Moreover, the conference reference recording and presentation program executed by the conference reference recording and presentation apparatus according to the embodiment may be provided while being pre-stored in a ROM or the like.

A reference presentation program executed by the conference reference recording and presentation apparatus according to the embodiment adopts a module configuration including the aforementioned units, the respective units are loaded into and are generated in a main memory when a CPU as actual hardware reads the conference reference recording and presentation program from the storage medium and executes it.

According to the embodiment described above, an information presentation method, information presentation apparatus, and information presentation program, which can update the importance level of display information in a search interface during presentation, and can review and present previous information presentation contents based on the updated display information in the search interface, can be provided. Therefore, a work time required for information presentation and search during the conference can be shortened, and a time period to be devoted to essential discussions can be prolonged.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information presentation method comprising:
    recording external data acquired via an input device during display of presentation information on a display device;
    calculating a feature amount from the external data;
    calculating an importance level by integrating the feature amount for sections of a display period of the presentation information;
    generating a plurality of first headline information items for parts of the presentation information corresponding to sections of the display period having an importance level which exceeds a predetermined threshold;
    presenting the first headline information items on the display device;
    accepting a selection of one of the first headline information items, the selection being made during display of the presentation information using the input device;
    searching for previous display contents of the presentation information in response to the selection;
    generating a copy of the previous display contents;
    displaying the copy of the previous display contents on the display device;
    generating a second headline information item for the copy of the previous display contents;
    associating the second headline information item with the selected first headline information item in real time; and
    displaying, on the display device in real time during display of the presentation information, the selected first headline information item and the associated second headline information item aligned at different time positions along a time axis.

2. The method according to claim 1, wherein the importance level is calculated by multiplying the feature amount by an importance level calculation ratio which is different depending on types of feature amounts.

3. The method according to claim 1, wherein the feature amount reflects a degree of attention to the presentation information, and represents one of a duration of a display time of the presentation information or an amount of an operation which is given via the input device.

4. The method according to claim 3, wherein the importance level is set to be higher with increasing display time of identical contents of the presentation information.

5. The method according to claim 1, further comprising displaying one of a character string and an icon indicating the type of feature amount which contributes to the importance level.

6. The method according to claim 1, further comprising displaying the time axis on a timeline user interface screen which includes a display area having a length of a time section according to the importance level, and is used in the selection operation of the first headline information item.

7. The method according to claim 6, further comprising identifiably displaying the first headline information item and the second headline information item on the timeline user interface screen.

8. An information presentation apparatus comprising:
    a display device to display presentation information;
    an input device to acquire external data during display of presentation information on the display device;
    a storage device to store a feature amount calculated from the external data acquired by the input device;
    a calculation unit configured to calculate an importance level by integrating the feature amount for sections of a display period of the presentation information;
    a generation unit configured to generate a plurality of first headline information items for parts of the presentation information corresponding to sections of the display period having an importance level which exceeds a predetermined threshold; and
    a user interface configured to control the display device to display the generated first headline information items on the display device, accept a selection of one of the first headline information items during display of the presentation information, and search for previous presentation contents of the presentation information in response to the selection, wherein the generation unit generates a copy of the previous presentation contents and generates a second headline information item for the copy of the previous presentation contents and associates the second headline information item with the selected first headline item in real time, and the user interface controls the display device to display in real time during display of the presentation information the selected first headline information item and the associated second headline information item, aligned at different time positions along a time axis.

9. The apparatus according to claim 8, wherein the importance level is calculated by multiplying the feature amount by an importance level calculation ratio which is different depending on types of feature amounts.

10. The apparatus according to claim 8, wherein the feature amount reflects a degree of attention to the presentation information, and represents one of a duration of a display time of the presentation information or an amount of an operation which is given via the input device.

11. The apparatus according to claim 10, wherein the importance level is set to be higher with increasing display time of identical contents of the presentation information.

12. The apparatus according to claim 8, wherein the user interface controls the display device to display one of a character string and an icon indicating the type of feature amount which contributes to the importance level.

13. The apparatus according to claim 8, wherein the user interface controls the display device to display the time axis on a display area having a length of a time section according to the importance level, and the display area is used in the selection operation of the first headline information item.

14. The apparatus according to claim 13, wherein the user interface controls the display device to display the first headline information item and the second headline information item in association with each other.

15. The apparatus according to claim 8, wherein the display device includes an electronic whiteboard.

16. An information presentation program stored in a non-transitory computer-readable medium, the program comprising instructions for causing a computer to:
record external data acquired via an input device during display of presentation information on a display device;
calculate a feature amount from the external data;
calculate an importance level by integrating the feature amount for sections a display period of the presentation information;
generate a plurality of first headline information items for parts of the presentation information corresponding to sections of the display period having an importance level which exceeds a predetermined threshold;
present the generated first headline information items on the display device;
accept a selection of one of the first headline information items, the selection being made using the input device during display of the presentation information;
search for previous display contents of the presentation information in response to the selection;
display the previous display contents on the display device;
generate a second headline information item for the previous display;
associate the second headline information item with the selected first headline information item in real time; and
display, on the display device in real time during display of the presentation information, the selected first headline information item and the associated second headline information item aligned at different time positions along a time axis.

17. The method according to claim 1, further comprising:
editing the copy of the previous display contents, including additionally drawing on the copy of the previous display contents.

18. An information presentation apparatus comprising:
a display device to display presentation information;
an input device to acquire external data during display of presentation information on the display device;
a storage device to store a feature amount calculated from the external data acquired by the input device;
a calculation unit configured to calculate an importance level by integrating the feature amount for sections of a display period of the presentation information;
a generation unit configured to generate a plurality of first headline information items for parts of the presentation information corresponding to sections of the display period having an importance level which exceeds a predetermined threshold; and
a user interface configured to control the display device to display the generated first headline information items on the display device, accept a selection of one of the first headline information items during display of the presentation information, and search for previous presentation contents of the presentation information in response to the selection,
wherein the generation unit generates a copy of the previous presentation contents and generates a second headline information item for the copy of the previous presentation contents and associates the second headline information item with the selected first headline item in real time, and
the user interface controls the display device to display in real time during display of the presentation information the selected first headline information item and the associated second headline information item, aligned at different time positions along a time axis, and enables editing the copy of the previous display contents, including additionally drawing on the copy of the previous display contents.

* * * * *